Oct. 20, 1970   J. JAFFE   3,535,226
HYDROCARBON CONVERSION PROCESS
Filed Aug. 30, 1968
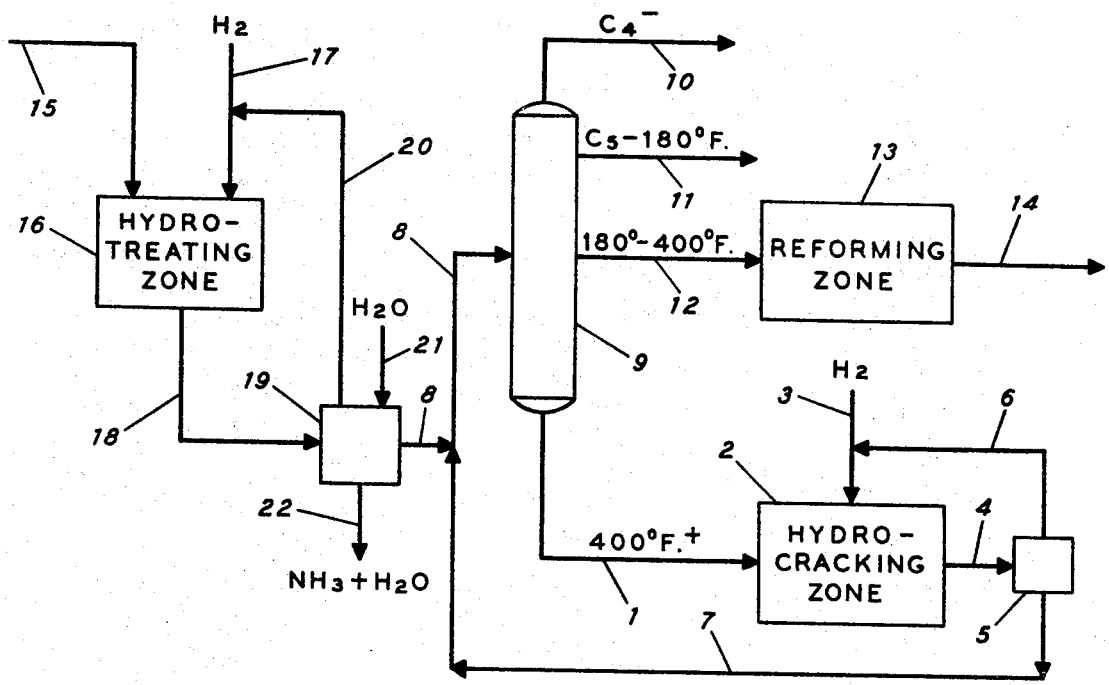
INVENTOR
JOSEPH JAFFE
BY R. H. Davies
ATTORNEY United States Patent Office 3,535,226
Patented Oct. 20, 1970

3,535,226
HYDROCARBON CONVERSION PROCESS
Joseph Jaffe, Berkeley, Calif., assignor to Chevron Research Company, San Francisco, Calif., a corporation of Delaware
Continuation-in-part of application Ser. No. 749,836, Aug. 2, 1968. This application Aug. 30, 1968, Ser. No. 756,501
Int. Cl. C10g 23/00
U.S. Cl. 208—59
5 Claims

ABSTRACT OF THE DISCLOSURE

A hydrocarbon conversion process which comprises hydrofining a hydrocarbon feedstock containing 200 to 10,000 p.p.m. N to reduce the nitrogen content thereof to between 0.1 and 10 p.p.m. N, and hydrocracking the resulting hydrofined feedstock in the presence of hydrogen and a catalyst comprising a crystalline zeolitic molecular sieve component substantially free of any catalytic metal or metals, a silica-containing gel component, a Group VI hydrogenating component, and a Group VIII hydrogenating component.

RELATED APPLICATION

This application is a continuation-in-part of Joseph Jaffe application Ser. No. 749,836, filed Aug. 2, 1968, for "Hydrotreating Catalyst and Process."

INTRODUCTION

This invention relates to catalytic hydrocracking of petroleum distillates and solvent-deasphalted residua to produce high-value fuel products, including gasoline.

PRIOR ART

It is known that a catalyst may comprise a crystalline zeolitic molecular sieve component associated with other catalyst components. It is also known that at least some of said other catalyst components may be in the form of a matrix in which the molecular sieve component is dispersed. It is also known that such catalysts may be used for such reactions as catalytic cracking, hydrocracking, and hydrodesulfurization. Representative prior art patents disclosing one or more of the foregoing matters include: U.S. Pat. 3,140,251; U.S. Pat. 3,140,253; British Pat. 1,056,301; French Pat. 1,503,063; and French Pat. 1,506,793.

The catalyst described in the above-mentioned copending Jaffe patent application Ser. No. 749,836, now abandoned comprising a crystalline zeolitic molecular sieve component substantially free of any catalytic metal or metals, is an improvement in catalysts comprising crystalline zeolitic molecular sieves in cogel matrices.

OBJECTS

It is an object of the present invention to provide a hydrocracking process using said improved catalyst described in said prior Jaffe application that is capable of producing excellent-quality gasoline and other valuable fuel products, and to provide methods of operating the hydrocracking process in an integrated manner with other process units to achieve various advantageous results.

The present invention will best be understood, and further objects and advantages thereof will be apparent, from the following description when read in connection with the accompanying drawing.

DRAWING

The drawing is a diagrammatic illustration of apparatus and flow paths suitable for carrying out the process of several of the embodiments of the present invention, including embodiments wherein a selected fraction from the hydrocracking zone is catalytically reformed.

STATEMENT OF INVENTION

In accordance with the present invention there is provided a hydrocarbon conversion process which comprises hydrofining in a first reaction zone a hydrocarbon feedstock selected from the group consisting of petroleum distillates, solvent-deasphalted petroleum residua, shale oils and coal tar distillates, said feedstock containing substantial amounts of materials boiling above 200° F. and containing 200 to 10,000 p.p.m. organic nitrogen, said hydrofining being accomplished in said first reaction zone in the presence of at least 500 s.c.f. of hydrogen per barrel of said feedstock and in the presence of a hydrofining catalyst, at a temperature in the range of 400° to 900° F., a pressure in the range 800 to 3500 p.s.i.g. and a liquid hourly space velocity in the range 0.1 to 5.0, said hydrofining being accomplished to the extent that the organic nitrogen content of said feedstock is reduced to between 0.1 and 10 p.p.m., and hydrocracking at least a substantial portion of the resulting hydrofined feedstock in a second reaction zone at a temperature in the range 400° to 950° F., a pressure in the range 800 of 3500 p.s.i.g., and a liquid hourly space velocity in the range 0.1 to 5.0, in the presence of 200 to 20,000 s.c.f. of hydrogen per barrel of hydrocarbon feedstock supplied to said second reaction zone, and in the presence of a catalyst composite comprising:

(A) A gel matrix comprising: (a) at least 15 weight percent silica; (b) alumina, in an amount providing an alumina-to-silica weight ratio of 15/85 to 80/20; (c) nickel or cobalt, or the combination thereof, in the form of metal, oxide, sulfide or any combination thereof, in an amount of 1 to 10 weight percent of said matrix, calculated as metal; and (d) molybdenum or tungsten, or the combination thereof, in the form of metal, oxide, sulfide or any combination thereof, in an amount of 5 to 25 weight percent of said matrix, calculated as metal;

(B) A crystalline zeolitic molecular sieve substantially in the ammonia or hydrogen form, substantially free of any catalytic loading metal or metals, said sieve further being in particulate form and being dispersed through said matrix; said catalyst composite being further characterized by an average pore diameter below 100 angstroms and a surface area above 200 square meters per gram.

Said gel matrix advantageously may further comprise titanium, zirconium, thorium or hafnium or any combination thereof in the form of metal, oxide, sulfide or any combination thereof, in an amount of 1 to 10 weight percent of said matrix, calculated as metal.

Said molecular sieve may be present in an amount of 1 to 50 weight percent, based on said catalyst.

The hydrocracking zone of the process of the present invention may be operated once through, or advantageously may be operated by recycling thereto materials from the effluent thereof that boil above 400° F. or, if desired, above 550° F. At least a portion of the materials boiling below 400° F. that are separated from the effluent from the hydrocracking zone advantageously may be catalytically reformed.

The reference to a crystalline zeolite molecular sieve "substantially free of any catalytic loading metal or metals" means that the molecular sieve contains no more than 0.5 weight percent of catalytic metal or metals, based on the sieve. The catalytic metal or metals include the Group VI and VIII metals, excluding sodium.

HYDROCARBON FEEDSTOCKS

The feedstocks supplied to the hydrocracking zone containing a catalyst comprising a crystalline zeolitic molecular sieve component in the process of the present invention are selected from the group consisting of petroleum distillates, solvent deasphalted petroleum residua, shale oils and coal tar distillates. The feedstocks contain substantial amounts of materials boiling above 200° F., preferably substantial amounts of materials boiling in the range 350° to 950° F., and more preferably in the range 400° to 900° F. Suitable feedstocks include those heavy distillates normally defined as heavy straight-run gas oils and heavy cracked cycle oils, as well as conventional FCC feed and portions thereof. Cracked stocks may be obtained from thermal or catalytic cracking of various stocks, including those obtained from petroleum, gilsonite, shale and coal tar. As discussed hereinafter, the feedstocks may have been subjected to a hydrofining and/or hydrogenation treatment, which may have been accompanied by some hydrocracking, before being supplied to the hydrocracking zone containing the catalyst comprising a crystalline zeolitic molecular sieve.

NITROGEN CONTENT OF FEEDSTOCK

The feedstocks processed in the first reaction zone in the process of the present invention generally will contain 200 to 10,000 p.p.m. organic nitrogen. The hydrofining accomplished in the first reaction zone will reduce this nitrogen content to between 0.1 and 10 p.p.m. organic nitrogen. The hydrofining step advantageously may also accomplish hydrogenation and a reasonable amount of hydrocracking.

SULFUR CONTENT OF FEEDSTOCKS

While the process of the present invention can be practiced with utility when supplying to the hydrocracking zone containing a catalyst comprising a molecular sieve component, hydrocarbon feeds containing relatively large quantities of organic sulfur, it is preferable to maintain the organic sulfur content of the feed to that zone in a range of 0 to 3 weight percent, preferably 0 to 1 weight percent.

FIRST STAGE HYDROFINING CATALYST

(A) General

The first stage hydrofining catalyst comprises a hydrogenating component selected from Group VI metals and compounds thereof, a hydrogenating component selected from Group VIII metals and compounds thereof, and a support selected from the group consisting of alumina and silica-alumina.

The hydrofining catalyst preferably has both hydrofining activity and hydrogenation activity, and even more preferably also has enough hydrocracking activity to convert 0.2 to 50, preferably 5 to 20, weight percent of the hydrocarbon feedstock to products boiling below the initial boiling point of the feedstock in a single pass. The hydrogenation activity preferably is sufficient to saturate or partially saturate a substantial portion of the organic oxygen, nitrogen and sulfur compounds in the feed to water, ammonia, and hydrogen sulfide.

Preferably, said hydrofining catalyst contains nickel or cobalt or compounds thereof in an amount of 1 to 15 weight percent, calculated as metal, and molybdenum or tungsten or compounds thereof in an amount of 5 to 30 weight percent, calculated as metal, with the remainder of the catalyst consisting of alumina, or silica-alumina containing up to 50 weight percent silica.

Particularly preferred examples of said hydrofining catalyst, comprising silica-alumina, are:

| | Percent by weight of total catalyst, calculated as metal | | | $SiO_2/Al_2O_3$ weight ratio |
|---|---|---|---|---|
| | Ni | Mo | W | |
| (1) | 4-10 | 15-25 | | 10/90-30/70 |
| (2) | 6-15 | | 15-30 | 30/70-50/50 |

It has been found that use of said hydrofining catalyst, particularly when it has substantial hydrogenation activity, increases the gasoline yield from the hydrocracking stage containing a catalyst comprising a molecular sieve component, compared with the gasoline yield from the hydrocracking stage when the identical feed thereto has not previously been processed in the presence of said hydrofining catalyst. The increased gasoline yield probably is related to the hydrogenation, in that more saturated hydrocarbon structures tend to crack more easily.

The hydrocracking catalyst comprising a molecular sieve component has activity and stability advantages over a conventional hydrocracking catalyst. It has been found that use of said hydrofining catalyst in the above-described arrangements further increases the activity and stability of the hydrocracking catalyst containing a molecular sieve component, compared with the activity and stability of the latter catalyst when the identical feed thereto has not previously been processed in the presence of said hydrofining catalyst to reduce the nitrogen content of the feedstock to between 0.1 and 10 parts per million.

(B) Method of preparation

Said hydrofining catalyst may be prepared by any conventional preparation method, including impregnation of an alumina or silica-alumina support with salts of the desired hydrogenating component, or cogelation of all components, with the latter method being preferred.

SECOND STAGE CATALYST COMPRISING A CRYSTALLINE ZEOLITIC MOLECULAR SIEVE COMPONENT AND PREPARATION THEREOF

(A) General

The second stage catalyst is an effective hydrocracking catalyst. The crystalline zeolitic molecular sieve component of the catalyst may be of any type that is known in the art as a useful component of a conventional hydrocracking catalyst containing a crystalline zeolitic molecular sieve component. A decationized molecular sieve cracking component is preferred. Especially suitable are faujasite, particularly "Y" type and "X" type faujasite, and mordenite, in the ammonia or hydrogen form.

(B) Method of preparation

The molecular sieve component of the catalyst may be prepared by any conventional method known in the art.

The molecular sieve component may be dispersed in a matrix of the other catalyst components by cogelation of said other components around said molecular sieve component in a conventional manner.

The molecular sieve component, substantially in the ammonia or hydrogen form, may be maintained substantially free of any catalytic loading metal or metals, as required by the present invention, by dispersing the molecular sieve component in a slurry of the precursors of the other catalyst components at a pH of 5 or above. When a sodium form of molecular sieve component is one of the starting materials, it may be converted to the ammonia or hydrogen form by ion exchange prior to being combined with the other catalyst components. Alternatively, it may be combined with the other catalyst components and then converted to the ammonia or hydrogen form by ion exchange. In either case, the molecular sieve component should not be combined with the precursors of the other catalyst components at a pH below 5.

The catalyst, in hydrogel form, is dried in a conventional manner, and then desirably is activated in an oxygen-containing gas stream for 1 to 10 hours at 900° to 1600° F., preferably 2 to 8 hours at 1200° to 1500° F.

The finished catalyst may be sulfided in a conventional manner prior to use, if desired. If not presulfided, the catalyst will tend to become sulfided during process operation from any sulfur content that may be present in the hydrocarbon feed.

OPERATING CONDITIONS

The hydrocracking zone containing the catalyst comprising a molecular sieve component is operated at hydrocracking conditions including a temperature in the range 400° to 950° F., preferably 500 to 850° F., a pressure in the range 800 to 3500 p.s.i.g., preferably 1000 to 3000 p.s.i.g., a liquid hourly space velocity in the range 0.1 to 5.0, preferably 0.5 to 5.0, and more preferably 0.5 to 3.0. The total hydrogen supply rate (makeup and recycle hydrogen) to said zone is 200 to 20,000 s.c.f., preferably 2000 to 20,000 s.c.f., of hydrogen per barrel of said feedstock.

The operating conditions for the hydrofining zone, which also may accomplish hydrogenation and some hydrocracking, include a temperature of 400° to 900° F., preferably 500° to 800° F., a pressure of 800 to 3500 p.s.i.g., preferably 1000 to 2500 p.s.i.g., and a liquid hourly space velocity of 0.1 to 5.0, preferably 0.5 to 3.0. The total hydrogen supply rate (makeup and recycle hydrogen) is 200 to 20,000 s.c.f. of hydrogen per barrel of feedstock, preferably 2000 to 20,000 s.c.f. of hydrogen per barrel of feedstock.

The operating conditions in the reforming zone and catalytic cracking zone employed in various embodiments of the present invention are conventional conditions known in the art.

PROCESS OPERATION WITH REFERENCE TO DRAWING

Referring now to the drawing, in accordance with a primary embodiment of the present invention, a hydrocarbon feedstock as previously described, which in this case may boil above 400° F. and which contains between 0.1 and 10 p.p.m. organic nitrogen, is passed through line 1 into hydrocracking zone 2, which contains a hydrocracking catalyst comprising a molecular sieve component substantially free of any catalytic loading metal, dispersed in a gel matrix comprising a silica-alumina gel, a Group VIII hydrogenation component, and a Group VI hydrogenation component. The feedstock is hydrocracked in hydrocracking zone 2 at conditions previously discussed, in the presence of hydrogen supplied through line 3. From hydrocracking zone 2 an effluent is withdrawn through line 4, hydrogen is separated therefrom in separator 5, and hydrogen is recycled to hydrocracking zone 2 through line 6. From separator 5, hydrocracked materials are passed through lines 7 and 8 to distillation column 9, where they are separated into fractions, including a $C_4^-$ fraction which is withdrawn through line 10, a $C_5$—180° F. fraction which is withdrawn through line 11, and a 180°–400° F. fraction which is withdrawn through line 12.

In accordance with another embodiment of the present invention, the 180°–400° F. fraction in line 12 is reformed under conventional catalytic reforming conditions in reforming zone 13, from which a catalytic reformate is withdrawn through line 14.

In accordance with a further embodiment of the present invention, a hydrocarbon feedstock containing 200 to 10,000 p.p.m. organic nitrogen which is to be hydrofined and also hydrogenated and/or partially hydrocracked, if desired, in a separate hydrotreating zone prior to being hydrocracked in hydrocracking zone 2, is passed through line 15 to hydrotreating zone 16 containing a catalyst, as previously described, having hydrofining activity and desirably also having substantial hydrogenation activity. The feedstock is hydrotreated in zone 16 at conditions previously described, in the presence of hydrogen supplied through line 17, and thereby the organic nitrogen content thereof is reduced to between 0.1 and 10 parts per million. The effluent from hydrotreating zone 16 is passed through line 18 to separation zone 19, from which hydrogen separated from the treated feedstock is recycled through line 20 to hydrotreating zone 16. In zone 19, water entering through line 21 is used to scrub ammonia and other contaminants from the incoming hydrocarbon stream, and the ammonia, water and other contaminants are withdrawn from zone 19 through line 22.

EXAMPLES

The following examples are given for the purpose of further illustrating the practice of the process of the present invention. However, it is to be understood that these examples are given by way of exemplification only, and are not intended in any way to limit the scope of the present invention.

EXAMPLE 1

A cogelled catalyst (catalyst A) of the following composition was prepared.

| Component: | Wt. percent of total catalyst |
|---|---|
| NiO | 8.2 |
| $WO_3$ | 18.2 |
| $TiO_2$ | 5.6 |
| $Al_2O_3$ | 24.0 |
| $SiO_2$ | 24.0 |
| Crystalline zeolitic molecular sieve, sodium "Y" form | 20.0 |
| Total | 100.0 |

The catalyst was prepared by the following steps, using sufficient quantities of the various starting materials to produce the above-indicated weight percentages of the components of the final catalyst:

(1) An aqueous acidic solution was prepared, containing $AlCl_3$, $TiCl_4$ $NiCl_2$ and acetic acid.

(2) Three alkaline solutions were prepared: (1) a sodium silicate solution; (2) a sodium tungstate solution; and (3) an ammonia solution containing sufficient excess ammonia so that upon combining the alkaline solutions with the acidic solution coprecipitation of all of the metal-containing components would occur at a neutral pH of about 7.

(3) The acidic and alkaline solutions were combined, and coprecipitation of all of the metal-containing components occurred at a pH of about 7, resulting in a slurry.

(4) Linde sodium "Y" crystalline zeolitic molecular sieve in finely divided form was added to the slurry.

(5) The molecular-sieve containing slurry was filtered to produce a molecular sieve-containing hydrogel filter cake, which was washed repeatedly with dilute ammonium acetate solution, to remove sodium and chloride ionic impurities from both the hydrogel and the molecular sieve contained therein.

(6) The molecular sieve-containing hydrogel was dried in an air-circulating oven and then was activated in flowing air for approximately 5 hours at 950° F.

The finished catalyst was characterized by a surface area above 394 m.²/g., a pore volume of 0.423 cc./g., an average pore diameter of 43 angstroms, and a molecular sieve component substantially free of catalytic metals; that is, substantially all of the nickel, tungsten and titanium in the catalyst was located in the gel portion of the catalyst rather than in the molecular sieve component thereof.

EXAMPLE 2

A conventional commercial cogelled catalyst comprising silica-alumina and 10 weight percent nickel (Catalyst B, a comparison catalyst) was prepared.

EXAMPLE 3

Catalysts A and B were separately used to hydrocrack separate portions of a heavy gas oil feedstock which had been hydrofined in the presence of a conventional hydrofining catalyst to reduce the organic nitrogen content from above 200 parts per million to 9 parts per million.

The gas oil feedstock had the following characteristics:

| | |
|---|---:|
| Gravity, ° API | 27.5 |
| Aniline point, ° F. | 182 |
| Sulfur content, p.p.m. | 8 |
| Nitrogen content, p.p.m. | 9 |
| ASTM distillation, D-1160: | |
| ST/5 | 403/499 |
| 10/30 | 531/604 |
| 50 | 672 |
| 70/90 | 752/868 |
| 95/EP | 912/967 |

The hydrocracking conditions were:

| | |
|---|---|
| Total pressure, p.s.i.g. | 1900. |
| Total hydrogen rate, s.c.f./bbl. | 5600. |
| Liquid hourly space velocity, v./v./hr. | 1.5. |
| Per-pass conversion to products boiling below 500° F., vol. percent | 60. |
| Starting temperature, ° F. | As indicated below. |

The hydrocracking was accomplished on a recycle basis, that is, with recycle to the hydrocracking zone from the effluent thereof materials boiling above 500° F.

The hydrocracking activities of the two catalysts, as measured by the operating temperatures necessary to achieve the indicated per-pass conversion, and the fouling rates of the two catalysts, as indicated by the hourly rise in temperature necessary to maintain the indicated per-pass conversion, were:

| | Catalyst A | Catalyst B |
|---|---|---|
| Operating temperature, ° F | 635 | 665 |
| Fouling rate, ° F./hr | 0.05 | 0.04 |

From the foregoing it may be seen that catalyst A is substantially more active than catalyst B, and has a similar low fouling rate. The activity of catalyst A is considerably higher, and the fouling rate is considerably lower, in this operation with a feedstock containing between 0.1 and 10 p.p.m. nitrogen, than in an operation where the feedstock contains substantially higher amounts of nitrogen.

EXAMPLE 4

The 180°–400° F. portion of the product of Example 3, obtained with catalyst A, is catalytically reformed, using a conventional reforming catalyst and conventional reforming conditions, and is found to be a superior feedstock for this operation.

Although only specific embodiments of the present invention have been described, numerous variations can be made in these embodiments without departing from the spirit of the invention, and all such variations that fall within the scope of the appended claims are intended to be embraced thereby.

What is claimed is:

1. A hydrocarbon conversion process which comprises hydrofining in a first reaction zone a hydrocarbon feedstock selected from the group consisting of petroleum distillates, solvent-deasphalted petroleum residua, shale oils and coal tar distillates, said feedstock containing substantial amounts of materials boiling above 200° F. and containing 200 to 10,000 parts per million organic nitrogen, said hydrofining being accomplished in said first reaction zone in the presence of a least 500 s.c.f. of hydrogen ber barrel of said feedstock and in the presence of a hydrofining catalyst, at a temperature in the range 400° to 900° F., a pressure in the range 800 to 3500 p.s.i.g., and a liquid hourly space velocity in the range 0.1 to 5.0, said hydrofining being accomplished to the extent that the organic nitrogen content of said feedstock is reduced to between 0.1 and 10 parts per million, and hydrocracking at least a substantial portion of the resulting hydrofined feedstock in a second reaction zone at a temperature in the range 400° to 950° F., a pressure in the range 800 to 3500 p.s.i.g., and a liquid hourly space velocity in the 3500 p.s.i.g., and a liquid hourly space velocity in the range 0.1 to 5.0, in the presence of 200 to 20,000 s.c.f. of hydrogen per barrel of hydrocarbon feedstock supplied to said second reaction zone, and in the presence of a catalyst composite comprising:

(A) A gel matrix comprising:
  (a) at least 15 weight percent silica,
  (b) alumina, in an amount providing an alumina-to-silica weight ratio of 15/85 to 80/20,
  (c) nickel or cobalt, or the combination thereof, in the form of metal, oxide, sulfide or any combination thereof, in an amount of 1 to 10 weight percent of said matrix, calculated as metal,
  (d) molybdenum or tungsten, or the combination thereof, in the form of metal, oxide, sulfide or any combination thereof, in an amount of 5 to 25 weight percent of said matrix, calculated as metal;
(B) A crystalline zeolitic molecular sieve substantially in the ammonia or hydrogen form, substantially free of any loading metal or metals, said sieve further being in particulate form and being dispersed through said matrix;

said catalyst composite being further characterized by an average pore diameter below 100 angstroms and a surface area above 200 square meters per gram.

2. A process as in claim 1, wherein said gel matrix further comprises titanium, zirconium, thorium or hafnium or any combination thereof, in the form of metal, oxide, sulfide or any combination thereof, in an amount of 1 to 10 weight percent of said matrix, calculated as metal.

3. A process as in claim 1, wherein materials boiling above 400° F. are separated from the effluent from said second reaction zone and are recycled to said second reaction zone.

4. A process as in claim 3, wherein said recycled materials boil above 550° F.

5. A process as in claim 1 wherein materials boiling below 400° F. are separated from the effluent from said second reaction zone and at least a portion of said separated materials are catalytically reformed.

References Cited

UNITED STATES PATENTS

| 3,132,087 | 5/1964 | Kelley et al. | 208—60 |
| 3,140,253 | 7/1964 | Plank et al. | 208—120 |

DELBERT E. GANTZ, Primary Examiner

A. RIMENS, Assistant Examiner

U.S. Cl. X.R.

208—60, 89, 111